United States Patent Office 3,431,775
Patented Mar. 11, 1969

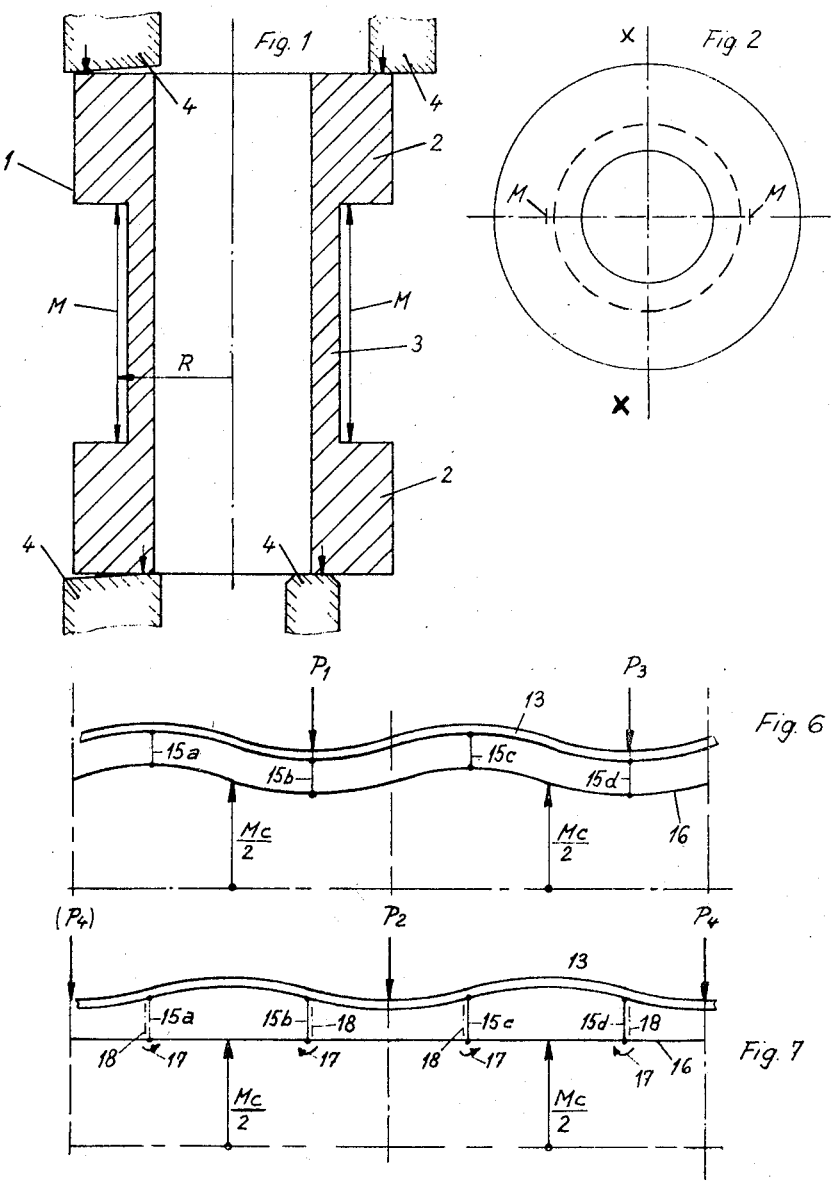

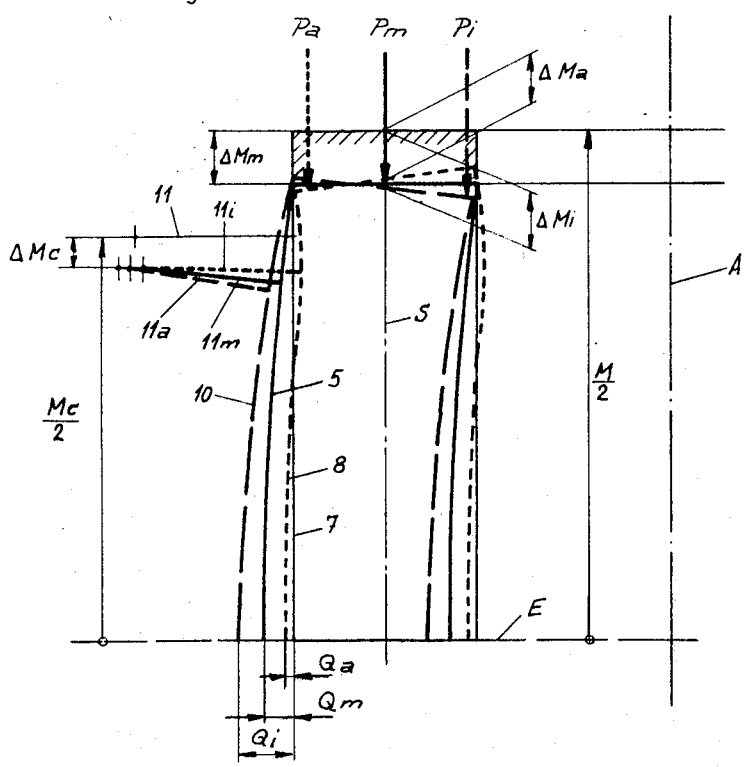

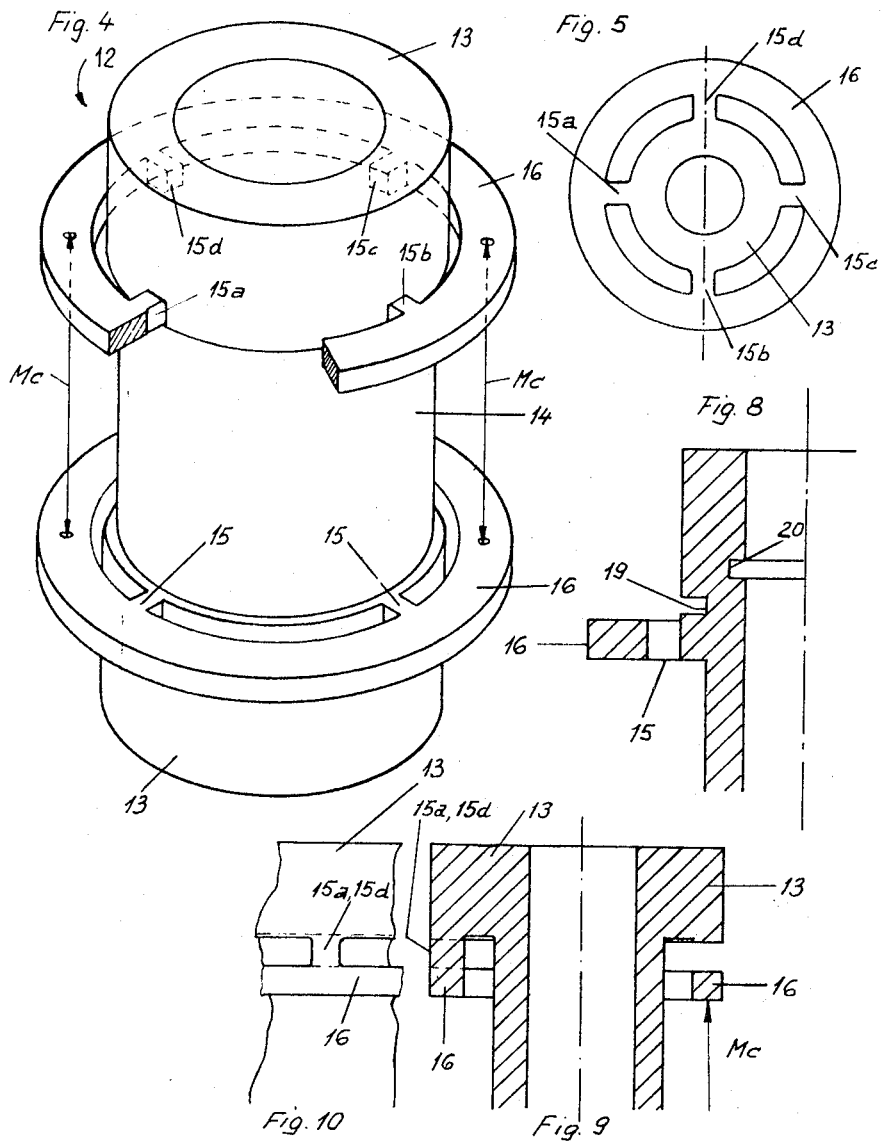

3,431,775
RESILIENT BODY FOR DYNAMOMETER
Armin Wirth, Zurich, Switzerland, assignor to Wirth, Gallo & Co., Zurich, Switzerland
Filed Sept. 19, 1966, Ser. No. 580,521
Claims priority, application Switzerland, Dec. 3, 1965, 16,759/65
U.S. Cl. 73—141                 8 Claims
Int. Cl. G01l 3/00

ABSTRACT OF THE DISCLOSURE

A dynamometer for determining compressive forces comprising a hollow resilient body having load bearing end faces is disclosed. Two distortion compensating rings spaced from each other and from the end faces are attached to the body by an even number of web members. A number of seats are provided on each ring turned toward each other for receiving measuring devices. The number of seats on each ring is half the number of webs on each ring.

---

The present invention relates to a resilient body with an axial bore for dynamometers, comprising a cylindrical body with end faces for application thereto of the thrust.

The use in dynamometers of cylindrical compression members in which the bore is coaxial with the direction of action of the load is known in the art. Such compression members are needed for instance for measuring the force in straining cables or in connection with hollow straining presses. However, they may also be used between unbroken press faces in the same way as other dynamometers. Their field of application is therefore wider than that of dynamometers containing compression members that are not axially bored.

In the latter the force that is to be measured is transmitted through small coaxial circular surfaces or through a point. The deformation is then intended to be measured in the axis of rotation itself.

The above described conditions for accurate measurement are not applicable to dynamometers which have an axial bore. A known form of elastic compression member with an axial bore for dynamometers is formed with two relatively thick load-bearing rings with a portion of thinner wall section (hereinafter referred to as the "measuring ring") therebetween. The axial deformation of the latter between the inside faces of the load bearing rings is used as a measure of the magnitude of the load. However, various difficulties arise in this form of construction. The load should be transmitted to the compression member through relatively wide annular surfaces and the counter faces in presses and abutments are likewise of annular form. The diameters of the two annuli may not completely coincide with the diameters of the compression member. Consequently the load may be transmitted to the compression member through narrow annular surfaces which have mean diameters that may vary in size. This results in the cylindrical measuring ring being subjected, not only to pure compression, but also to shear between consecutive imaginary shells of the member. Moreover, larger or smaller diameters of the annulus through which the load is transmitted (hereinafter referred to as the diameter of the thrust circle) or thrust applying surfaces which are only technically flat but actually slightly convex or concave may cause the cross section of the load bearing rings to tilt and the magnitude as well as the direction of this tilt may vary. The tilt affects the radial strain of the hollow cylindrical measuring ring. An increase in radial strain thus generated also involves an increase in axial strain and conversely. It follows that different diameters of the thrust circle by changing the radial strain may considerably affect the axial strain of the measuring ring and hence the indicated measurement.

In order to eliminate errors due to eccentric loading, the axial strain of the measuring ring may be measured at two diametrically opposite points and the mean value of the two measurements indicated by a measuring instrument. However, measuring the length of two lines has the drawback that whenever the contact faces through which the load is transmitted are slightly uneven or even slightly dirty, as is unavoidable for instance on building sites, the indicated value is not a good mean. In other words, a discontinuous distribution of the load around the thrust circle may considerably change the indication.

The object of the present invention is to provide elastic compression member which will give an accurate indication when used between faces having thrust circle diameters that considerably differ as well as when the distribution of the load around the circumference of the thrust circle is discontinuous.

The proposed elastic compression member is characterised by being provided with two compensating rings each affixed thereto by an even number of web members, said rings each having half as many measuring points as there are pairs of web members.

Embodiments of the subject matter of the invention are illustratively shown in the accompanying drawings in which FIG. 1 is an axial section of a conventional elastic compression member with an axial bore, FIG. 2 is a cross section of the compression member in FIG. 1, FIG. 3 is a fragmentary section of a cylindrical compression member, FIG. 4 is a perspective view of one embodiment of the proposed elastic compression member, FIG. 5 is a plan view of the embodiment of FIG. 4, FIGS. 6 and 7 are developments of the load bearing and compensating rings under load, FIG. 8 is a variant and FIGS. 9 and 10 are another variant.

FIGS. 1 and 2 diagrammatically represent a compression member 1 with an axial bore, of known construction. This member comprises two load bearing rings 2 and a portion 3 of weaker section, constituting the measuring ring, therebetween. The two measured distances M are offset from the symmetry axis A of the compression member 1 by the radial distance R. It will be readily understood that a load acting principally in the line of the distances M that are measured will give rise to an indication exceeding that due to a load acting principally in the symmetry axis X between these two measured lines. FIG. 1 also illustrates the manner in which irregularities in the load applying faces 4 or differences in diameter of the annular end faces may result in different loads being applied to the dynamometer near its inside or outside circumferences.

FIG. 3 diagrammatically illustrates the load distribution in a tubular body to which a load is applied on a small, medium and large diameter, the effect of these loads upon radial and axial strain and how this is compensated. The drawing represents a quarter section through the longitudinal axis. If a load $P_m$ acts on a circle of average diameter and is determined by measuring (half) the length $M/2$ in the centre of gravity line S of the wall (or if the load is transmitted by a face resting flat on the end face of the compression member and flat contact is maintained), then this load will generate a moderate radial strain 5 (measured as $Q_m$ in the centre cross section E). For the sake of simplicity the measured length $M/2$ is shown extending over the full length of the tubular member, since this does not affect directional relationships. The load reduces the measured length $M/2$ by an amount $\Delta Mm$. The radial strain 5 decreases to nil towards the load bearing face.

However, if a load $Pa$ of the same magnitude as that of $Pm$ acts on a larger diameter, then the load bearing face of the compression member will be deformed as shown in the drawing and the radial strain 8 in the middle part of the member will be less. This strain is represented in the centre cross section E by $Qa$. Moreover, the reduction in length is likewise less and is shown as being $\Delta Ma$.

If a load $Pi$, likewise of the same magnitude as $Pm$, acts on a smaller thrust circle, then the end faces will tilt in the opposite direction to that caused by $Pa$ and the resultant radial strain is now greater. Its magnitude in the centre cross section E is marked $Qi$. The change in length $\Delta Mi$ is likewise greater than in the two former cases.

The difference between $\Delta Mi$ and $\Delta Ma$ may be between 5 and 25% of $\Delta Mm$ according to the ratio of the diameters, the wall thickness and the length of the member. It will thus be readily understood that such an arrangement would not be useful.

FIG. 3 schematically shows an arm 11; $11a$, $11m$ and $11i$ are the positions this arm will occupy when the loads $Pa$, $Pm$ and $Pi$ are applied. This method of representation reveals that if the measured line is not coincident with the centre of gravity line S but outwardly displaced by the length of arm 11 a fresh measuring line $Mc/2$ can thus be created. By appropriately choosing the length of arm 11 it is now possible by the tilt of the arms, on the line intersection at the ends of the arms to compensate the differences in the length of the centre of gravity line produced by the loads $Pa$ or $Pi$. FIG. 4 illustrates an embodiment of the subject matter of the invention in perspective. The compression member 12 comprises two load bearing rings 13 and a centre portion 14 of reduced cross section. Two compensating rings 16 are affixed to the load bearing rings 13 by web members 15. The two measured lines $Mc$ have been transferred to a position between facing surfaces of the compensating rings 16 midway between two pairs of web members 15.

FIGS. 6 and 7 are developments of the upper load bearing ring 13 and of the associated compensating ring 16 under different loads.

In FIG. 6 the load P1 and P3 (strip load) is so applied that it acts above diametrically opposite web members $15b$ and $15d$. This causes an undular distortion of the load bearing ring 13 of periodicity 2. The compensating ring 16 which is connected by four web members $15a$, $15b$, $15c$ and $15d$ to the load bearing ring 13 also assumes the undular shape of the load bearing ring 13. The measured lines $Mc/2$ are at the nodes. It will be seen that the measurement $Mc/2$ reflects the mean distortion of the load bearing ring 13.

FIG. 7 illustrates a disposition of the load which is shifted in relation to FIG. 6, the loads P2 and P4 acting midway between two web members. It will be seen that this type of loading likewise causes an undular distortion of the load bearing ring 13 (periodicity 2), but that this distortion is not now transmitted by the web members $15a$ to $15d$ to the compensating ring 16. The latter remains undistorted. It will also be understood that the position of the compensating ring 16 corresponds to the mean value of the distortion of the load bearing ring 13. It is assumed that the web members $15a$ to $15d$ cooperate at least with the load bearing ring 13 as if they were articulated thereto. Since for technical reasons the web members $15a$ to $15d$ cannot be thus attached by ideal articulations, the rotation of the joints of the web members at the load bearing ring 13 transmits a torque in each case to the compensating ring 16 in the direction indicated by curled arrows 17. Consequently the compensating ring 16 will in fact also be slightly distorted and assume a curvature in the same direction as that of the load bearing ring 13. The distance $Mc/2$ will not therefore represent the mean value exactly. It will be slightly too large. If the web members $15a$ to $15d$ are now displaced in the directions indicated by the dot-dash lines 18, then this will correct the error in the required direction. The magnitude of the necessary displacement can be determined by strain calculation or by practical test.

It will be clear that in the intermediate positions of a strip load of periodicity 2, which are not shown in FIGS. 6 and 7 mean values are likewise produced. If the periodicity of the load is 3, 5 and more, acceptable mean values are likewise produced.

If the periodicity is 4 there is no mean value formation. For the following reasons this is of considerable importance. The interference frequency 4 does not often occur in machine tools and is certainly of smaller amplitude than lower periodicities. Moreover, the amplitude of the undulation of the load bearing ring 13 as such diminishes with the 4th power of the periodicity. At the periodicity 4 the amplitude impressed on the compensating ring is therefore sixteen times smaller than that at the periodicity 2. In conjunction with what has been said above this shows that the effect on the result produced by the periodicity 4 is very slight.

On the lines $Mc$ referred to in the specification and drawings any desired measuring instruments may be used. If separate measuring devices are employed (for instance dial gauges) then their indications must be added together. However, it is quite readily possible, for instance by means of a lever system, to add the two indications $Mc$ and deliver them to a single indicating element. For effecting the addition two coupled elements of the kind described for instance in the U.S. patent application Ser. No. 477,186 filed August 4, 1965, and now abandoned are particularly suitable.

FIG. 8 illustrates a variant. It has been found that the presence of annular grooves 19 and 20 considerably affects the magnitude of the radial and hence axial strain of the measuring ring. Such grooves 19, 20 are preferably provided for the purpose of an accurate adjustment to eliminate the effect of the diameter on which the load acts. The effect of such grooves can be estimated or examined by photo-elastic methods.

FIGS. 9 and 10 illustrate a slightly different arrangement. In this instance the compensating ring 16 is not located outside but below the load bearing ring 13. Four web members $15a$, $15d$ are again provided between the load bearing ring 13 and the compensating ring 16. The two measuring lines are likewise on opposite sides on the bisector of the angle between the web axes.

The grooves 19 in FIG. 8 may be machined directly adjacent the load bearing ring to a depth which results in the web members 15 not being directly located at the load bearing ring 13 but at the transition zone between the measuring ring and the load bearing ring. The principle of the arrangements is not thereby changed.

In the above examples the elastic compression member is always shown provided with load bearing ring 13. However, it will be understood that these are not indispensable. In principle, the compression member consists of a cylindrical body with end faces that may serve as load bearing faces. The above explanations relating to the compensating rings 16 and the grooves 19, 20 could be directly applied to a compression member lacking the load bearing rings.

I claim:

1. A dynamometer for determining compressive forces comprising a hollow resilient body the end faces of which act as load bearing faces, two distortion compensating rings spaced from one another and from said end faces attached to said body by an even number of web members, seats on the faces of said rings turned towards each other for receiving measuring devices, the number of seats on each compensating ring being half that of the web members.

2. A dynamometer according to claim 1, wherein each seat on one compensating ring corresponds to a seat on the other compensating ring and that a line between said corresponding seats is parallel to the axis of the resilient body.

3. A dynamometer according to claim 2, wherein the hollow resilient body has one or more annular grooves provided on at least one of its nonload bearing surfaces.

4. A dynamometer according to claim 1, wherein a load bearing ring of larger cross section than said hollow resilient body is attached to each end face.

5. A dynamometer according to claim 4, wherein each load bearing ring has at least one external annular groove.

6. A dynamometer according to claim 4, wherein each load bearing ring has at least one internal annular groove.

7. A dynamometer according to claim 1, wherein the web members are substantially equidistantly spaced from one another.

8. A dynamometer according to claim 7, wherein the seats on the compensating rings are situated substantially midway between web members.

References Cited

UNITED STATES PATENTS

| | | |
|---|---|---|
| 2,591,255 | 4/1952 | Hard af Segerstad et al. _ 73—141 |
| 2,809,517 | 10/1957 | Schmidt _____ 73—141 |

FOREIGN PATENTS

| | | |
|---|---|---|
| 838,539 | 6/1960 | Great Britain. |

RICHARD C. QUEISSER, *Primary Examiner.*

CHARLES A. RUEHL, *Assistant Examiner.*